United States Patent
Ahn

[11] Patent Number: 5,775,615
[45] Date of Patent: Jul. 7, 1998

[54] VCR HAVING A REEL SENSOR PRISM DEVICE

[75] Inventor: Seong Ick Ahn, Seoul, Rep. of Korea

[73] Assignee: Daewoo Electronics Co., Ltd., Seoul, Rep. of Korea

[21] Appl. No.: 719,071

[22] Filed: Sep. 24, 1996

[30] Foreign Application Priority Data

Sep. 30, 1995 [KR] Rep. of Korea ............. 95-33435

[51] Int. Cl.⁶ ........................................... G11B 23/08
[52] U.S. Cl. ............................. 242/333.2; 242/344
[58] Field of Search ....................... 242/333.2, 344, 242/357, 534; 360/74.1, 74.4, 74.6

[56] References Cited

U.S. PATENT DOCUMENTS

| | | | |
|---|---|---|---|
| 3,925,817 | 12/1975 | Althuber et al. | 360/74.6 |
| 4,057,839 | 11/1977 | Banks | 360/74.6 |
| 4,616,274 | 10/1986 | Nagaoka | 242/333.2 |
| 4,783,022 | 11/1988 | Onmori et al. | 242/333.2 |
| 5,311,030 | 5/1994 | Higuchi et al. | 360/74.6 |
| 5,625,516 | 4/1997 | Kushiro | 360/74.6 |

FOREIGN PATENT DOCUMENTS

| | | | |
|---|---|---|---|
| 1 254 377 | 11/1967 | Germany | 360/74.6 |
| 23 41 669 | 2/1975 | Germany | 242/344 |
| 55-70947 | 5/1980 | Japan | 360/74.6 |

*Primary Examiner*—John P. Darling
*Attorney, Agent, or Firm*—Beveridge, DeGrandi, Weilacher & Young LLP

[57] ABSTRACT

A VCR has a reel sensor prism device fabricated by being separated into a scattering member and a fixing member. The scattering member includes a cylindrical body part for transmitting light and a head formed to the upper portion of the body part for scattering the light. A fixing member is formed with a center hole of being inserted with the body part of the scattering member, and two pairs of hooks are formed to the lower end. A base for supporting and fixing the fixing member is formed with two pairs of hook holes and a thruhole for passing the light generated from a reel sensor light emitting part therethrough. By this construction, the light generated from the reel sensor light emitting part is prevented from being scattered at the body part to minimize loss of the transmitted light, thereby maximizing the transmitting effect of the light and preventing a malfunction of the VCR. Also, the assembling is completed by fitting the hooks of the fixing member into the hook holes to improve assemblage and productivity.

8 Claims, 3 Drawing Sheets

VCR HAVING A REEL SENSOR PRISM DEVICE

BACKGROUND OF THE INVENTION

1. Field of the Invention

The present invention relates to a reel sensor prism device employed to the interior of a video cassette recorder (VCR), and more particularly to a VCR having a reel sensor prism device, wherein overall body part is cut off by means of a fixing member, and the reel sensor prism device is fixed onto a base by a hook pattern for facilitating assembling job and preventing light transmitted from a reel sensor light emitting part from being dimmed out.

2. Description of the Prior Art

An optical sensor is generally utilized for sensing a starting portion and an ending portion of a tape within a conventional VCR. That is, since the starting portion and ending portion of the tape is formed by a trailer transparent tape and a reader transparent tape capable of transmitting light, the light scattered from a reel sensor prism via the transparent tapes reaches an end sensor and a start sensor placed onto the right and left of a head drum. A controlling part then receives generated signals of the end sensor and start sensor for monitoring the start and end of the tape.

Hereinbelow, the reel sensor prism device utilized within the conventional VCR will be described.

FIG. 1 illustrates a perspective view representing a state of installing the reel sensor prism device to the interior of the conventional VCR. As shown in FIG. 1, a full-width erase head 3 for erasing recorded content of a tape is installed to the left of an inclined head drum 1, and an audio head 7 for reading out voice content of the tape is installed to the right thereof. A plurality of posts 5 for guiding the travelling of the tape are installed around head drum 1. Reel sensor prism 10 is installed to one side of head drum 1 by a fixing screw 27.

FIG. 2 illustrates a sectional view of the reel sensor prism shown in FIG. 1. As shown in FIG. 2, reel sensor prism 10 is formed with a V-shaped groove 17 in the upper plane thereof, and a scattering part 11 for scattering light is formed to the lower portion of V-groove 17 in the form of a rectangular bar. The lower end of scattering part 11 is bent for forming a fixing part 15 to fix and support reel sensor prism 10.

A support stand 13 is fitted around fixing part 15 to be closely attached thereto, and the lower plane of support stand 13 is fixed to a base 25 by means of fixing screw 27. Here, fixing screw 27 pierces through fixing part 15, support stand 13 and base 25 for fixing them altogether.

Base 25 is formed with a thruhole 23 in an area corresponding to scattering part 11 for permitting the light to transmit therethrough, and a reel sensor light emitting part 21 installed onto a circuit board 20 is disposed to the lower portion of thruhole 23.

In operation, the conventional reel sensor prism device constructed as above functions as below.

The light generated from reel sensor light emitting part 21 passes through thruhole 23 to reach fixing part 15. Thereafter, the light is scattered over the nearby area at the upper surface of fixing part 15, the body of scattering part 11 and V-groove 17. The scattered light is transmitted to an end sensor or start sensor via the transparent portion of the tape. By this transmission, the controlling part can monitor the current winding status of the tape.

However, in the conventional reel sensor prism device having the above-described construction, the reel sensor prism is coupled by means of the fixing screw to involve a drawback of lowering the assemblage. Furthermore, the scattering part is thoroughly exposed to increase the quantity of scattered light, which in turn makes the capability of sensing the light by the end sensor and start sensor weak to cause a malfunction.

SUMMARY OF THE INVENTION

Therefore, present invention is devised to solve the foregoing problems. It is an object of the present invention to provide a VCR having a reel sensor prism device, wherein a reel sensor prism is manufactured by being separated into a scattering member and a fixing member, and the scattering member is inserted into a center hole of the fixing member for preventing light having been transmitted from a reel sensor light emitting part to the scattering member from being lost due to scattering over the nearby area.

It is another object of the present invention to provide a VCR having a reel sensor prism device for improving assemblage of the reel sensor prism device.

To achieve the above object of the present invention, there is provided a VCR having a reel sensor prism device including a scattering member which is formed with a body part for transmitting light and a head provided to an upper portion of the body part for scattering the light. A fixing member is formed with a center hole for being inserted with the body part of the scattering member through the center portion thereof, and at least one pair of hooks formed to a lower end. In addition, a base is formed with at least one pair of hook holes in areas of corresponding to the hooks of the fixing member, and a thruhole in the center of the hook holes for allowing the light generated from a reel sensor light emitting part to pass therethrough.

Here, it is preferable that the body part of the scattering member has a cylindrical shape, and the center hole of the fixing member has a cylindrical shape.

Also, the fixing member is preferably as long as at least the length of the body part of the scattering member.

The head of the scattering member may be formed with a V-shaped groove in an upper plane thereof, and a fixing jaw larger than the body part may be further formed between the body part and head of the scattering member.

More preferably, the hook of the fixing member is formed by two pairs, and the hook hole of the base is formed by two pairs.

Alternatively, to achieve the above object of the present invention, a VCR having a reel sensor prism device includes a scattering member which has a cylindrically-shaped body part for transmitting light, a head formed with a V-shaped groove provided to an upper portion of the body part for scattering the light, and a fixing jaw larger than the body part provided between the body part and head. A fixing member formed with a cylindrically-shaped center hole as long as at least the length of the body part of the scattering member is inserted with the body part of the scattering member through the center portion thereof, and includes two pairs of hooks formed to a lower end. Also, a base is formed with two pairs of hook holes in areas of corresponding to the hooks of the fixing member, and a thruhole is provided in the center of the hook holes for allowing the light generated from a reel sensor light emitting part to pass therethrough.

In the VCR having the reel sensor prism device according to the present invention constructed as above, the light generated from the reel sensor light emitting part passes through the body part after passing through the thruhole. Then, the light is scattered at the head solely.

The VCR having the reel sensor prism device can prevent the scattering of the light generated from the reel sensor light emitting part at the body part, thereby minimizing the loss of the transmitted light. By doing so, the transmitting effect of the light is maximized and the malfunction of the VCR is prevented. Additionally, the assembling is completed only by fitting the hook of the fixing member into the hook hole to be advantageous of improving assemblage and productivity.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A VCR having a reel sensor prism device according to the present invention will be described in detail with reference to accompanying drawings.

Figure 1:
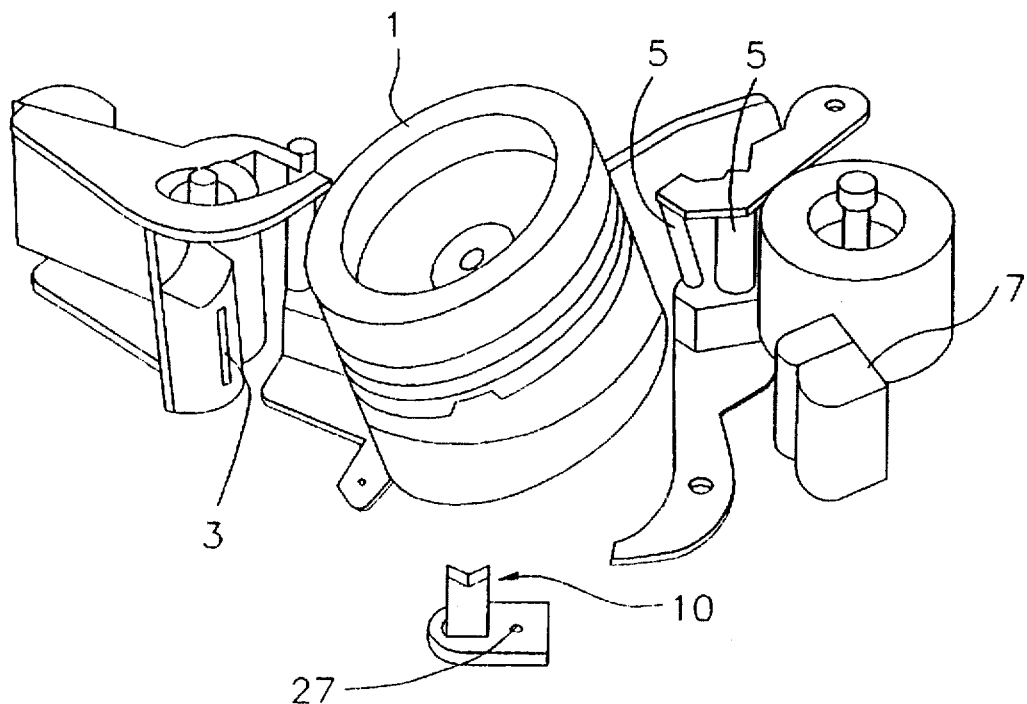
FIG. 1 is a perspective view showing a state that a reel sensor prism is installed within a conventional VCR.
Figure 2:
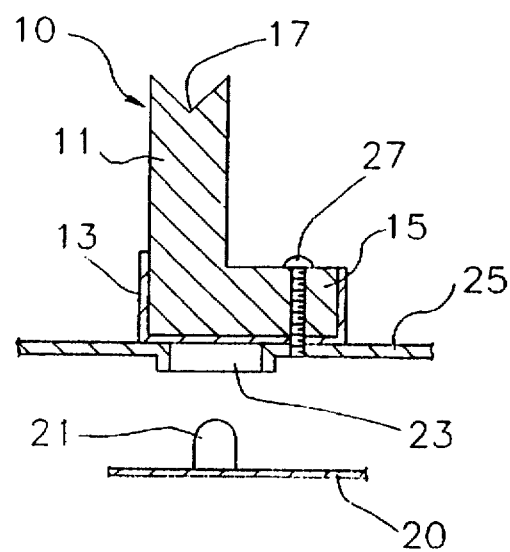
FIG. 2 is a sectional view of the reel sensor prism shown in FIG. 1.
Figure 3:
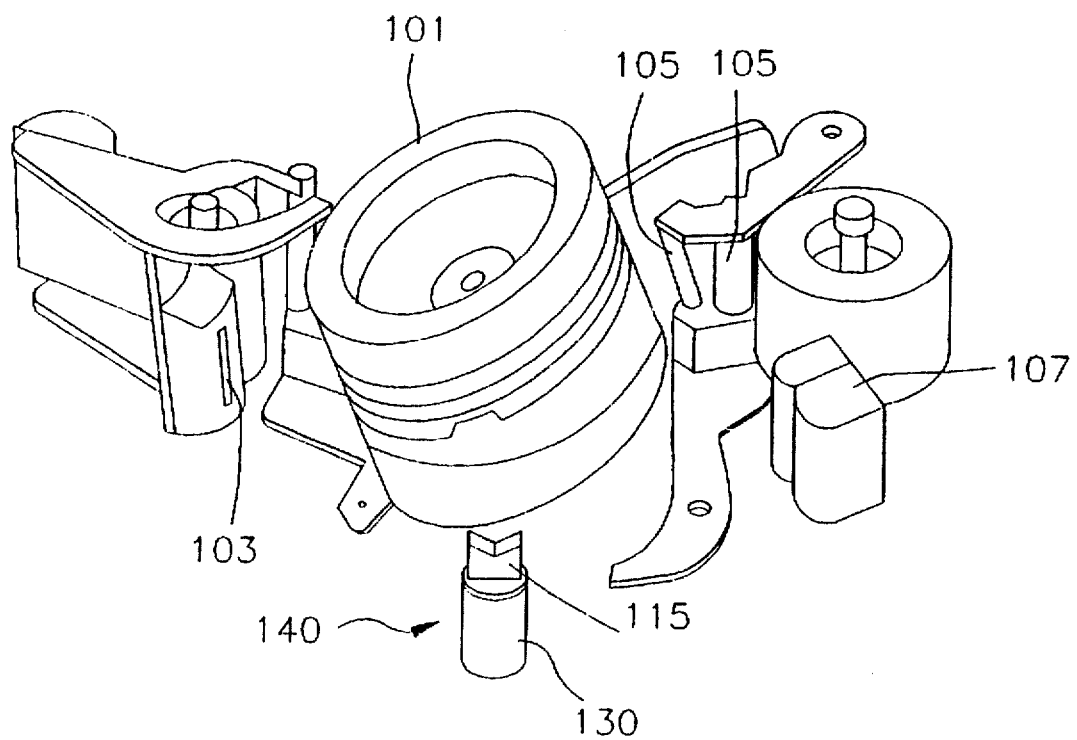
FIG. 3 is a perspective view schematically showing an installing state within a VCR having a reel sensor prism device according to the present invention.

FIG. 3 is a perspective view schematically showing an installing state within the VCR having the reel sensor prism device according to the present invention. As shown in FIG. 3, a full-width erase head 103 for erasing recorded content of a tape is installed to the left of an inclined head drum 101, and an audio head 107 for reading out voice content of the tape is installed to the right thereof. Also, a plurality of posts 105 for guiding the travelling of the tape are installed around head drum 101. A reel sensor prism 140 is installed to one side of head drum 101, and a head 115 for scattering the light is installed to the upper portion of a fixing member 130 through which the light cannot be transmitted.

Figure 4:
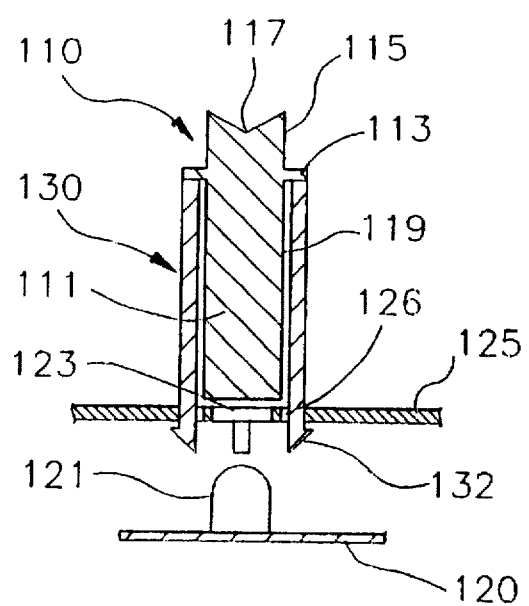
FIG. 4 is a sectional view of the reel sensor prism device shown in FIG. 3.
Figure 5:
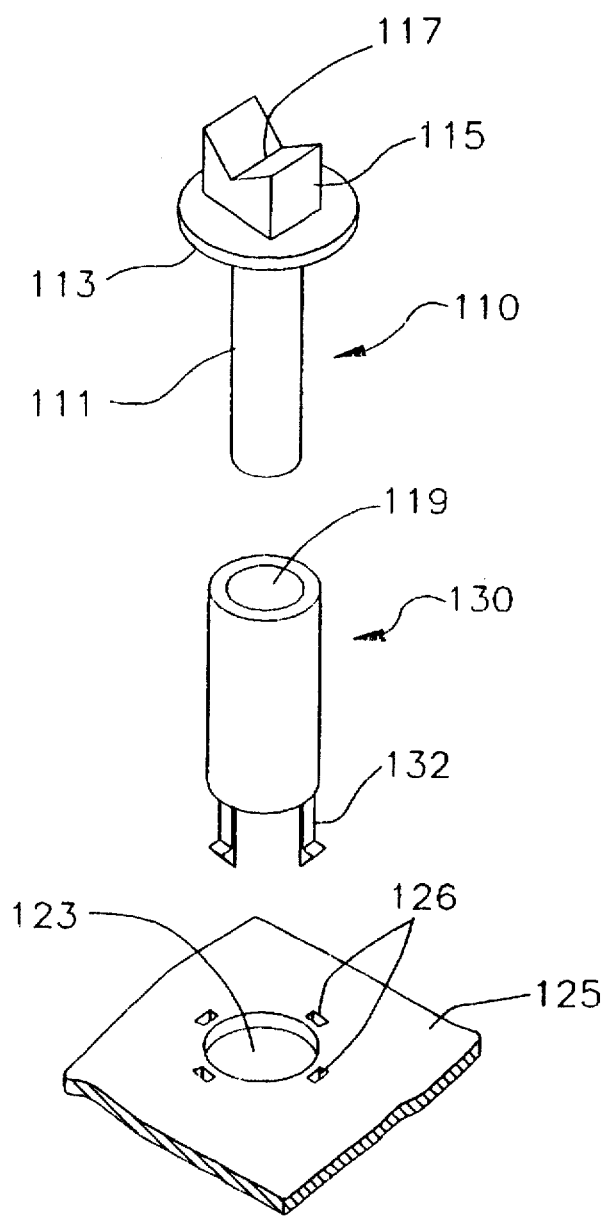
FIG. 5 is a perspective view of the reel sensor prism device shown in FIG. 3.

FIG. 4 is a sectional view of the reel sensor prism device shown in FIG. 3, and FIG. 5 is a perspective view of the reel sensor prism device shown in FIG. 3. As shown in FIGS. 4 and 5, reel sensor prism 140 is formed by a scattering member 110 and fixing member 130.

A reel sensor light emitting part 121 for emitting the light is installed onto a circuit board 120 disposed to the bottom portion.

A base 125 is installed to the upper portion of reel sensor light emitting part 121, and is formed with a thruhole 123 of a predetermined dimension. Four hook holes 126 are formed around thruhole 123 at the regular interval.

Fixing member 130 is formed of a substance through which the light cannot be transmitted, and an overall appearance thereof is shaped as a cylinder. Four elastic hooks 132 project from the lower end of fixing member 130 while maintaining the regular interval, and a center hole 119 is formed through the center thereof.

A body part 111 of scattering member 110 is cylindrically-shaped to have a diameter slightly smaller than center hole 119 for being fitted into center hole 119, and has a length slightly shorter than or identical to that of center hole 119. Head 115 for scattering the light is installed to the upper portion of body part 111, and a V-shaped groove is engraved in the upper plane of head 115.

A fixing jaw 113 having a slightly greater diameter than that of center hole 119 is formed between head 115 and body part 111. Head 115, fixing jaw 113 and body part 111 are fabricated in a body by means of a substance capable of transmitting the light.

The VCR having the reel sensor prism device according to the present invention constructed as above is assembled as follows.

Hooks 132 of fixing member 130 are pushed into respective hook holes 126 to install fixing member 130 onto base 125. Thereafter, body part 111 of scattering member 110 is inserted into center hole 119 to be assembled. Scattering member 110 is inserted until fixing jaw 113 becomes in contact with fixing member 130. Thus, the assembling of the reel sensor prism device is completed.

The VCR having the reel sensor prism device according to the present invention completed through the above-stated assembling procedure involves the following operation and effect.

The light generated from reel sensor light emitting part 121 passes through body part 111 after passing through thruhole 123. At this time, the light does not pass through fixing member 130 to be transferred toward head 115. The light reaching head 115 is scattered over a nearby area at the peripheral surface of head 115 and V-groove 117.

The scattered light neither passes through an opaque tape recorded with data in the tape nor makes an end sensor (not shown) and a start sensor (not shown) be responsive thereto. For this reason, a controlling part (not shown) determines that the opaque tape recorded with the data is currently being travelled.

On the other hand, when a transparent tape is being travelled, the scattered light passes through the transparent tape to make the end sensor or start sensor be responsive thereto. Thus, the controlling part senses the starting or ending status of the tape.

As a result, the VCR having the reel sensor prism device according to the present invention can prevent the scattering of the light generated from the reel sensor light emitting part at the body part, thereby minimizing loss of the transmitted light. By doing so, the transmitting effect of the light is maximized while preventing a malfunction of the VCR. In addition, the assembling is completed only by fitting the hooks of the fixing member into the hook holes to improve assemblage and productivity.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A VCR having a reel sensor prism device comprising:
   a scattering member formed by a body part for transmitting light and a head provided to an upper portion of said body part for scattering said light;
   a fixing member formed with a center hole for being inserted with said body part of said scattering member through the center portion thereof, and at least one pair of hooks formed to a lower end;

a base formed with at least one pair of hook holes in areas of corresponding to said hooks of said fixing member, and a thruhole in the center of said hook holes for allowing said light generated from a reel sensor light emitting part to pass therethrough; and a fixing law larger than said body part formed between said body part and head of said scattering member.

2. A VCR having a reel sensor prism device as claimed in claim 1, wherein said body part of said scattering member has a cylindrical shape.

3. A VCR having a reel sensor prism device as claimed in claim 2, wherein said center hole of said fixing member has a cylindrical shape.

4. A VCR having a reel sensor prism device as claimed in claim 3, wherein said fixing member is as long as at least the length of said body part of said scattering member.

5. A VCR having a reel sensor prism device as claimed in claim 1, wherein said head of said scattering member is formed with a V-shaped groove in an upper plane thereof.

6. A VCR having a reel sensor prism device as claimed in claim 1, wherein said hook of said fixing member is formed by two pairs.

7. A VCR having a reel sensor prism device as claimed in claim 6, wherein said hook hole of said base is formed by two pairs.

8. A VCR having a reel sensor prism device comprising:

a scattering member formed by a cylindrically-shaped body part for transmitting light, a head having a V-shaped groove provided to an upper portion of said body part for scattering said light, and a fixing jaw larger than said body part provided between said body part and head;

a fixing member formed with a cylindrically-shaped center hole as long as at least the length of said body part of said scattering member for being inserted with said body part of said scattering member through the center portion thereof, and two pairs of hooks formed to a lower end; and a base formed with two pairs of hook holes in areas of corresponding to said hooks of said fixing member, and a thruhole in the center of said hook holes for allowing said light generated from a reel sensor light emitting part to pass therethrough.

* * * * *